(12) United States Patent
Zakorzhevsky et al.

(10) Patent No.: US 9,390,266 B1
(45) Date of Patent: Jul. 12, 2016

(54) SYSTEM AND METHOD OF PREVENTING INSTALLATION AND EXECUTION OF UNDESIRABLE PROGRAMS

(71) Applicant: Kaspersky Lab AO, Moscow (RU)

(72) Inventors: Vyacheslav V. Zakorzhevsky, Moscow (RU); Alexander A. Romanenko, Moscow (RU); Sergey V. Dobrovolsky, Moscow (RU); Yuri G. Slobodyanuk, Moscow (RU); Oleg A. Yurzin, Moscow (RU); Mikhail A. Pavlyushchik, Moscow (RU); Alexander A. Stroykov, Moscow (RU); Alexander V. Amrilloev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/944,821

(22) Filed: Nov. 18, 2015

(30) Foreign Application Priority Data

Jun. 30, 2015 (RU) ................................ 2015125976

(51) Int. Cl.
*G06F 21/56* (2013.01)
*H04L 29/06* (2006.01)
*G06F 9/445* (2006.01)

(52) U.S. Cl.
CPC ............ *G06F 21/561* (2013.01); *G06F 21/567* (2013.01); *H04L 63/1425* (2013.01); *H04L 63/1441* (2013.01); *G06F 8/60* (2013.01)

(58) Field of Classification Search
CPC ..... G06F 21/561–21/567; G06F 21/56–21/57; G06F 8/60–8/61; H04L 63/1441; H04L 63/1425
See application file for complete search history.

(56) References Cited

U.S. PATENT DOCUMENTS

| | | | | |
|---|---|---|---|---|
| 7,392,544 B1 * | 6/2008 | Pavlyushchik | ........ | G06F 21/562 713/187 |
| 7,765,592 B2 * | 7/2010 | Wang | ........................ | G06F 8/65 713/187 |
| 7,870,612 B2 * | 1/2011 | Liu | ........................ | G06F 21/562 713/188 |
| 8,181,247 B1 * | 5/2012 | Pavlyushchik | ........ | G06F 21/552 726/22 |
| 8,250,569 B1 * | 8/2012 | Badenell | ................... | G06F 8/61 717/174 |
| 8,347,386 B2 * | 1/2013 | Mahaffey | .............. | G06F 21/564 726/23 |
| 8,533,844 B2 * | 9/2013 | Mahaffey | .............. | G06F 21/564 709/203 |

(Continued)

*Primary Examiner* — Hadi Armouche
*Assistant Examiner* — Sher A Khan
(74) *Attorney, Agent, or Firm* — Arent Fox LLP; Michael Fainberg (57) ABSTRACT

Disclosed are systems and methods for controlling installation of programs on a computer. An exemplary system is configured to detect installation of an unknown program on a computer; suspend installation of the unknown program; execute the unknown program in a secure environment; detect undesirable actions of the unknown program, including: actions performed by the program without knowledge of a user, actions for accessing personal user data on the computer, and actions effecting user's working with other programs or operating system of the computer; determine whether the unknown program is undesirable or not based on the detected undesirable actions of the program; when the unknown program is determined be undesirable, prompt the user to select whether to allow or prohibit installation of the undesirable program on the computer; and when the unknown program is determined not to be undesirable, allow installation of the unknown program on the computer.

15 Claims, 6 Drawing Sheets

(56) References Cited

U.S. PATENT DOCUMENTS

| | | | |
|---|---|---|---|
| 9,235,704 B2* | 1/2016 | Wootton | G06F 21/564 |
| 9,245,154 B2* | 1/2016 | Andreasson | G06F 21/83 |
| 2003/0051027 A1* | 3/2003 | Aupperle | G06F 17/30864 |
| | | | 709/224 |
| 2005/0262503 A1* | 11/2005 | Kane | G06F 8/61 |
| | | | 717/176 |
| 2012/0002839 A1* | 1/2012 | Niemela | G06K 9/00973 |
| | | | 382/100 |
| 2012/0079596 A1* | 3/2012 | Thomas | G06F 21/55 |
| | | | 726/24 |
| 2012/0204264 A1* | 8/2012 | Jiang | H04L 41/12 |
| | | | 726/23 |
| 2013/0333039 A1* | 12/2013 | Kelly | G06F 21/51 |
| | | | 726/24 |

* cited by examiner

SYSTEM AND METHOD OF PREVENTING INSTALLATION AND EXECUTION OF UNDESIRABLE PROGRAMS

CROSS-REFERENCE TO RELATED APPLICATIONS

The present disclosure claims benefit of priority under 35 U.S.C. 119(a)-(d) to a Russian Application No. 2015125976 filed on Jun. 30, 2015, which is incorporated by reference herein.

FIELD OF TECHNOLOGY

The present disclosure relates generally to the field of computer security and more specifically to a system and method of preventing installation and execution of undesirable programs.

BACKGROUND

Many computer users frequently facing the consequences of the operation of malicious programs (also known as malware), which may block users' computer, cause theft of personal data, distribute spam, and perform other malicious actions. At the same time, the antivirus industry has not stood still and has developed antivirus technologies that make it possible to counter even unknown malicious programs effectively, e.g. emulation, behavioral analysis, and application control. Such antivirus technologies make it possible in many cases to lower the risk of infection of users' computers by malware or reduce the damage caused by the infection.

Together with the development of malicious programs, applications that do not implement malicious actions directly but can frequently annoy the user or compel him to take unnecessary actions, e.g. to pay for a license for a program whose functional features are useless, have recently become more common. Such applications are often called undesirable programs, pestware or junkware. We shall commonly call them undesirable programs.

The undesirable actions of these undesirable programs include, but not limited to:

Unsanctioned changes of the home page of a browser, of the search engine, and of the installation of all the possible browser add-ons (plug-ins), which often lead to unwanted operation of the browser. These are the most common undesirable actions.

This class of applications is often called FakeAV, a fake antivirus. On the one hand, it does not cause any harm to the user or his data, but on the other it insistently suggests buying a license for a useless functional feature (which works, but in fact does not carry any benefit).

Optimizer programs. As well as the actually useful utilities that optimize the operation of the operating system (by removing temporary files, unused branches of the register, etc.). There are many chargeable optimizer programs that carry out no useful actions but only contain an interface that informs the users of the "useful" actions carried out.

Also featuring frequently in the list of undesirable software are spyware programs that, without the knowledge of the user, can gather data about him and his computer. Situations when the user voluntarily installs such software, most often through lack of attention, are possible.

Undesirable programs usually do not perform any criminal actions of the kind that in most countries can invoke criminal penal sanctions (e.g. the distribution of malicious programs or the sending of spam), and they also have all the signs of legitimate programs—a graphical interface, licensing agreement, etc. Nevertheless, users are frequently dissatisfied with their operation—the programs constantly display the windows of their interface, or fail to fulfill the functional feature needed, leading to the result that the users wish to remove the programs and not install them again.

Methods for detection and removal of such programs are currently known. For example, the company Microsoft® in its utilities for removing undesirable programs provides its users with the option of distinguishing undesirable programs by pointing out their "undesirability" indicators: a deficiency of the graphical user interface GUI, a lack of information about the operation of the program, the display of an advertisement, etc.

However, such technologies are not free from certain defects, e.g. they cannot prevent the installation of undesirable programs or cancel ("rollback") the changes made.

Therefore, there is a need for more effective solution for detection and blocking of operation of programs that contain functional features that are undesirable for users.

SUMMARY

Disclosed are systems and methods of preventing installation and execution of undesirable programs. In one exemplary aspect, a system controls installation of programs on a computer by: detecting installation of an unknown program on a computer; suspending installation of the unknown program; executes the unknown program in a secure environment; detecting undesirable actions of the unknown program, including: actions performed by the program without knowledge of a user, actions for accessing personal user data on the computer, and actions effecting user's working with other programs or operating system of the computer; determining whether the unknown program is undesirable or not based on the detected undesirable actions of the program; when the unknown program is determined be undesirable, prompting the user to select whether to allow or prohibit installation of the undesirable program on the computer; and when the unknown program is determined not to be undesirable, allowing installation of the unknown program on the computer.

In one exemplary aspect, to determine whether the unknown program is undesirable or not, the system may assign numeric weights to the detected undesirable actions, wherein undesirable actions performed without user knowledge have greater numeric weights than other undesirable actions effecting user's working with other programs or operating system.

In one exemplary aspect, to determine whether the unknown program is undesirable or not, the system may add the numeric weights of the detected undesirable actions; and when the sum of the numeric weights of all detected undesirable actions exceeds a predetermined threshold, designate the unknown program to be undesirable.

In another exemplary aspect, the system may further save the user selection of whether to allow or prohibit installation of the unknown program on the computer; and upon later attempt to install or execute the same program on the user computer, automatically performs the saved user selection without prompting the user again.

In another exemplary aspect, to allow installation of the undesirable program on the computer, the system may further prevent execution of one or more detected undesirable actions of the program.

In another exemplary aspect, preventing execution of one or more detected undesirable actions of the program further includes: analyzing graphical user interface (GUI) of the program installer for presence of active undesirable GUI elements; and deactivating the detected undesirable GUI elements of the program installer.

In another exemplary aspect, the undesirable actions may further include at least one of: modification of network setting, modification of browser settings, creation of icons on the computer desktop and activation of popup windows.

In another exemplary aspect, a system may control execution of programs by: detecting an unknown program installed on a computer; identifying undesirable actions performed by the unknown program on the computer, wherein the undesirable actions include at least one of: actions performed by the program without knowledge of a user, actions for accessing personal user data on the computer, and actions effecting user's working with other programs or operating system of the computer; determining whether the unknown program is undesirable or not based on the identified undesirable actions of the program; when the unknown program is determined be undesirable, prompting the user to select whether to allow or prohibit execution of the undesirable program on the computer; and when the unknown program is determined not to be undesirable, allowing execution of the unknown program on the computer.

In another exemplary aspect, the system may further save the user selection of whether to allow or prohibit execution of the unknown program on the computer; and upon later attempt to execute the same program on the user computer, automatically perform the saved user selection without prompting the user again.

In another exemplary aspect, to allow execution of the undesirable program on the computer, the system may prevent execution of one or more detected undesirable actions of the program.

In another exemplary aspect, to prevent execution of one or more detected undesirable actions of the program, the system may further analyze graphical user interface (GUI) of the program installer for presence of active undesirable GUI elements; and deactivate the detected undesirable GUI elements of the program installer.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product of preventing installation and execution of undesirable programs. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
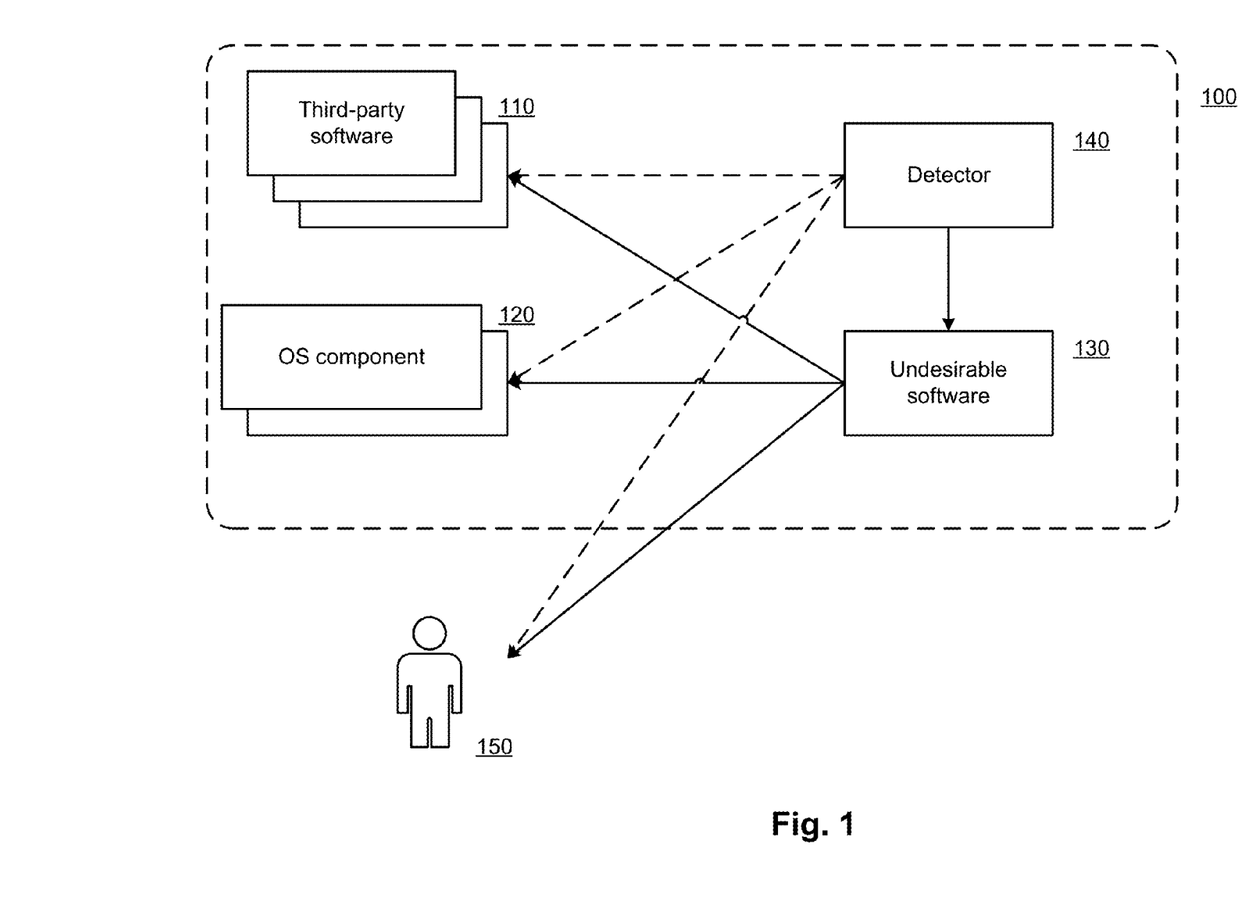
FIG. 1 illustrates an exemplary system of preventing installation and execution of undesirable programs on a computer system of a user.

FIG. 1 depicts an exemplary system of preventing installation and execution of undesirable programs on a computer system of a user. The user 150 uses different programs 110 (e.g. the browser Chrome or Internet Explorer, the text editor Notepad or Word, etc., which will be also referred herein after as "software" or "third-party software"), installed in the computer system 100. In addition to software 110, the system 100 also includes components of the operating system (OS) 120, which are responsible for the interaction of the programs and the user with different devices (e.g. printer, network services, etc.).

Also, the system 100 may include undesirable software 130, which can modify the third-party software 110 and its settings (e.g. in the form of a plug-in for the browser, by changing its home page), can introduce changes in the components of the operating system OS 120 (e.g. by installing a driver filter to implement the collection of information), or can periodically show the user 150 different information (e.g. in the form of FakeAV programs). To remove the undesirable software 130 a detector 140 is used, which appraises changes in the third-party software 110, in the components of the OS 120, and in the work of the user 150 with the graphical interface of the operating system. In one exemplary aspect, the detector 140 may be implemented as an antivirus software or included in the latter as a separate component.

Figure 2A:
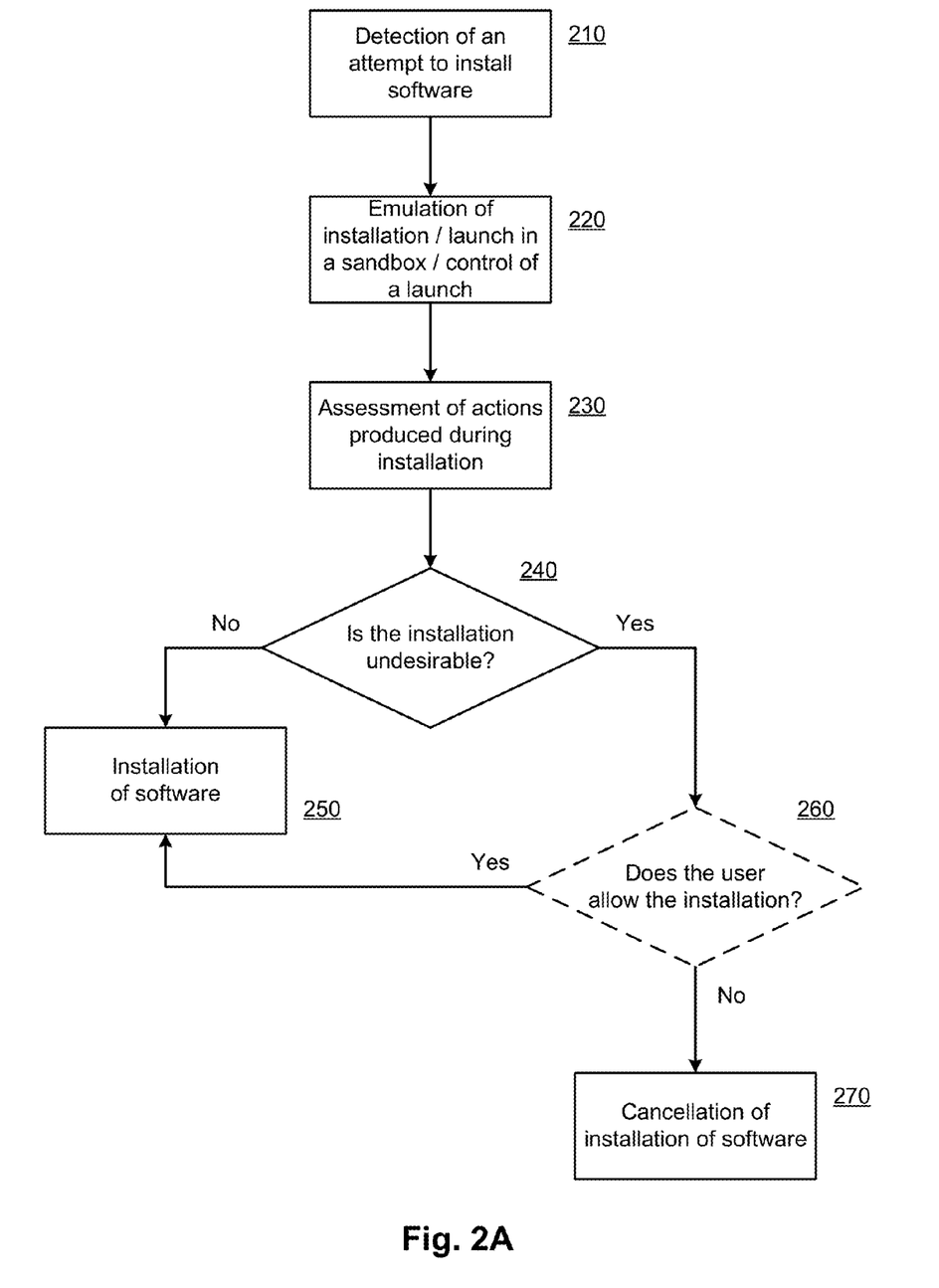
FIG. 2A illustrates an exemplary method of preventing installation of undesirable programs.

FIG. 2A depicts an exemplary method of preventing installation of undesirable programs. In the step 210, the system 100 detects an attempt to install unknown software. The unknown software can be any software that has one of the following signs:

It does not have a digital signature of the software manufacturer.

It is not contained either in the whitelist of allowed applications or in the malware list of at least one of the antivirus-software manufacturers.

In one exemplary aspect, a detected attempt to install unknown software takes the form of an interception, by means of the detector 140, of the opening of any file (installer) being executed. In yet another exemplary aspect, the attributes of the file being opened—the name (e.g. setup.exe), size, digital signature, date of appearance on the disc, etc. may be checked. Depending on these attributes, the need to check the given file is determined. An example of the realization of this technology is disclosed in commonly owned U.S. Pat. No. 7,392,544, which is incorporated by reference herein.

Interception of the opening of the executable file can be realized by means of interception of the loading via an image loader.

After detection of the attempt to install unknown software, in step 220, the system 100 executes the software in a secure environment. Emulation of the file can also be regarded as a launch in a secure environment, since none of the changes go beyond the framework of the emulator. A sandbox, which represents controllable set of resources (such as a virtual memory, files, register branches, network connections) can serve as an example of a secure environment. A further example of installation of unknown software is installation with tracking of all changes in the system 100 with the possibility of a subsequent rollback. An example of similar technology is described in a commonly owned U.S. Pat. No. 8,181,247, which is incorporated by reference herein. As the actions of the code of the file being executed are performed (using emulation or in the secure environment), at step 230, the system 100 performs an assessment of the actions produced from the point of view of undesirability.

As already mentioned, undesirable actions in general are actions of an application that annoy the user or compel him to do unnecessary things. Undesirable actions may produce changes in the third-party software 110 and the components of the OS 120, and affect the work of the user 150 with other programs and/or operating system (e.g. graphical interface of the operating system). Certain examples of undesirable actions can include, but not limited to:

change of the home page of the browser;
change of the default settings of the browser;
change of the network parameters (including the proxy server and the LSP, Layered Service Provider) technology;
addition of a new toolbar in the browser without the knowledge of the user;
creation of an auto-launch key in the OS registry;
addition of icons to the desktop and/or taskbar without the knowledge of the user;
attempt to access files from different folders of the user (e.g. from "C:/Users/<user_name>/My Documents") without the knowledge of the user;
presence of a large number of pop-up windows in the interface of an application (this can be characteristic for FakeAV);
presence in the code of URL links to uncertified sites, where it is demanded that the user pay for a key to further operation of the application or provide personal information;
changing key operating system component 120 like explorer.exe by adding additional graphical user interface menus which look annoying to the user 150.

If any action is carried out without the knowledge of the user, meaning that before it was carried out there was no display of any elements of the graphical interface of the application in which the user is offered a choice (e.g. to add the icon of the application to the desktop). Thus, the main criteria for undesirability of an action are that it is carried out without the knowledge of the user or that changes are made to the system that directly influence the work of the user with the operating system and with applications (e.g. with the browser).

It should be noted that the introduction of unknown software often consists in the installation of several components, in which case the installation of each component can be regarded as the installation of separate software, and, accordingly, the solution of the undesirability is undertaken for each component separately.

In one exemplary aspect, a definite weight is assigned to each action, depending on its undesirability (by means of the detector 140).

For example, Table 1 gives examples of the weights of undesirability of actions

TABLE 1

| Type of action | Weight of undesirability | Weight of undesirability with inclusion of the factor "without the knowledge of the user" |
| --- | --- | --- |
| Change of the home page of the browser | 20 | 100 |
| Creation of an auto-launch key in the OS registry | 100 | 100 |
| Addition of icons to the desktop and/or to the taskbar without the knowledge of the user | 10 | 15 |

Using the example in the above table it can be seen that if the user has himself agreed to the change of the home page of the browser (e.g. upon installation of unknown software), the weight of undesirability of such actions is rather small—about 20 units, whereas the same action without confirmation from the user himself immediately raises the undesirability to 100 units. In the given example it is assumed that when an undesirability of 100 units is reached the application being installed (or the file being executed) is recognized as undesirable (by means of the detector 140), and its installation is undesirable (step 240 in FIG. 2A). For certain actions the total weight of undesirability can be considered in the form of a simple sum of the weights of undesirability of each action, but more complicated examples of calculating the weight of undesirability take into account also the number of actions of each type and use correction coefficients (e.g. so that many actions with a small weight of undesirability cannot add to a weight equal to 100). In yet another exemplary aspect, the total weight of undesirability is equal to the maximum weight of undesirability of one of the actions.

Thus, at step 240, it is determined whether an installation is undesirable when the assessment carried out at step 230 is taken into account. For example, one of the criteria for checking can be the necessary appearance of one of the actions in an emulation process (implementation in a secure environment), such as "Change of the home page of a browser". Another exemplary aspect, presupposes comparison of the total weight of undesirability with a certain threshold value (e.g. 100). When the criteria of the check are fulfilled, or when a total weight of undesirability is exceeded, at step 260 the user may nevertheless be asked for permission to install. In one exemplary aspect, this can be done in order to lower the risk of false positives (e.g., first-order errors in which a legitimate application is mistakenly blocked as being malicious). An example of such an approach is one of the parts of the User Account Control (UAC) technology in Windows OS, when the user can nevertheless install an unknown application even in the absence of a digital signature. If the user agrees to the installation, or if a condition is not fulfilled at step 240, installation of the software occurs at step 250. Otherwise, the installation is canceled at step 270. The choice of the user with regard to installation of the software (or its cancellation) can be remembered (with the aid of the detector 140), and when similar undesirable software is detected in the future the step 260 can be omitted automatically, taking account of the previously formulated choice made by the user.

One way of cancelling an installation can be to place the undesirable software into an inactive state, e.g. to switch off a plug-in in a browser. This can be a safer way, since the risk of negatively influencing the operation of the third-party software 110 that relies on the given component is minimized, and it also gives the user the possibility of changing his solution in the future, i.e., of including the plug-in in the browser settings if he really needs it.

Figure 2B:
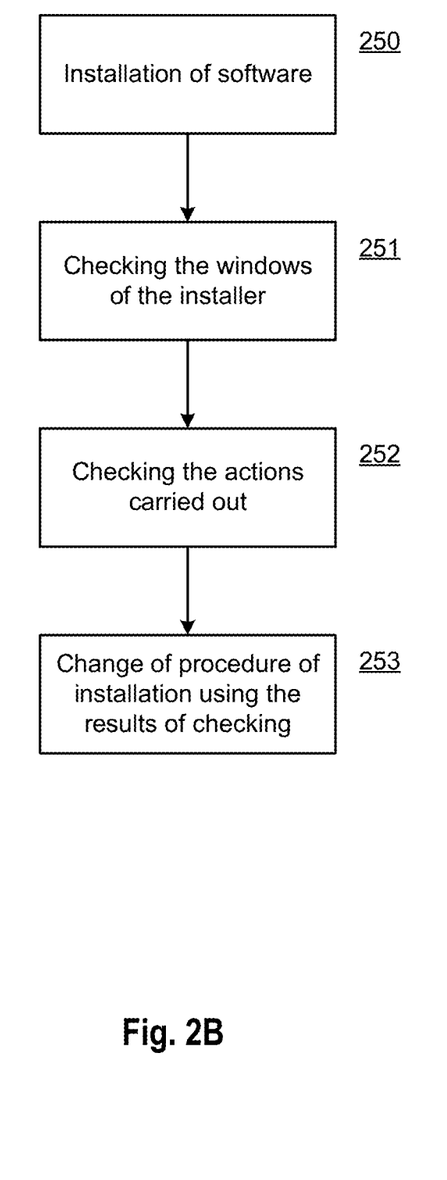
FIG. 2B illustrates an exemplary method of preventing installation of undesirable programs with cancellation of undesirable actions.
Figure 2C:
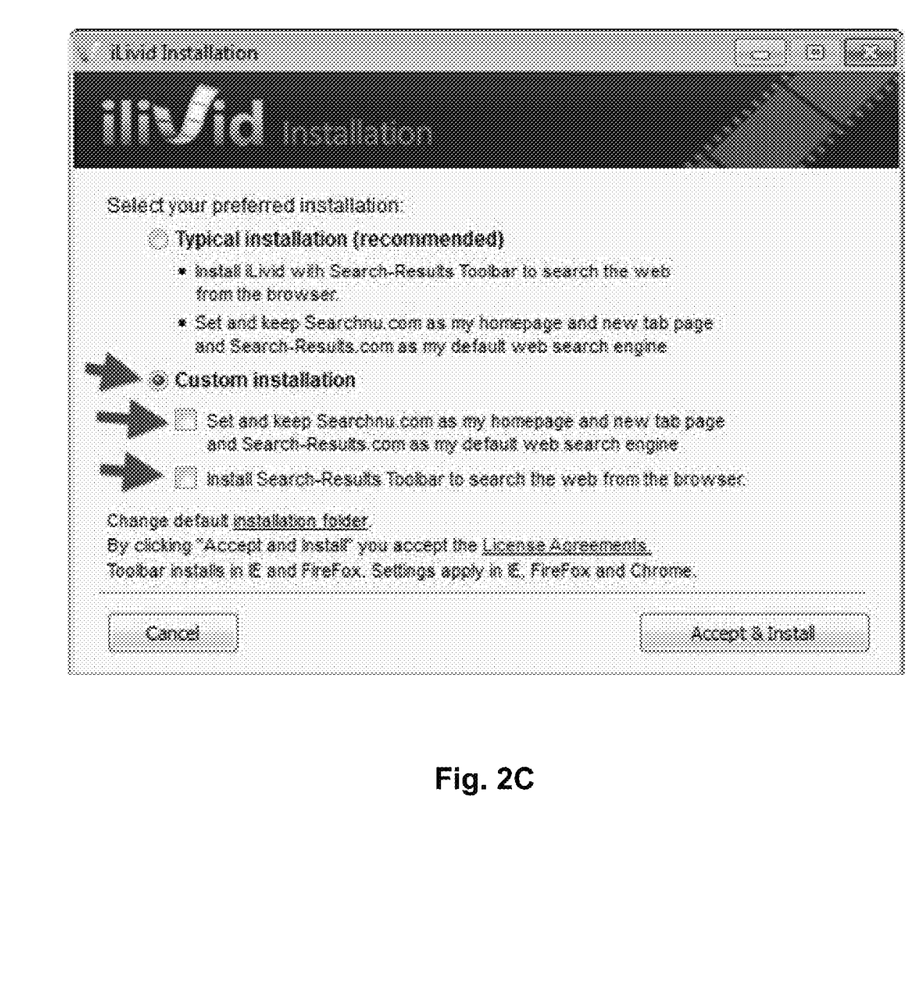
FIG. 2C illustrates an example of a window of the installer of potentially undesirable program.

The installation of software at step 250 can be performed with cancellation of a number of undesirable actions, and this makes it possible to install a program needed by the user. FIG. 2B depicts the approach to the installation of software with cancellation of undesirable actions. In step 251, the system 100 checks the windows of the installer as the software is installed; for example, all the active elements (such as RadioButton) in the window, and their description, are checked. FIG. 2C shows an example of a window of the installer of potentially undesirable software. Unchecking elements of the Checkbox type, which lead to change of the home page in a browser and set up an undesirable toolbar, makes it possible to avoid the indicated undesirable actions. In one exemplary aspect, the change of status of the elements is carried out by the detector 140. In step 252 (which can be carried out in parallel with step 251), changes in the system are also checked using the results of the operation of the installer—primarily, the tracking of file operations and registry operations. In step 253, all the undesirable actions found are canceled, or rolled back if the changes have already occurred in the OS. The cancellation of undesirable actions may be implemented as follows:

the use of a utility such as Unchecky to change active elements in the windows of the installer (Radio Button, Checkbox, etc.);

a prohibition on the performance of certain file operations or registry operations, such as the installation of an auto-launch registry entry or the writing of files into the folder "C:/Windows/system32";

installation of the program in a secure environment makes it possible to "pro-emulate" a number of undesirable actions during the installation of software, by not performing them in the real OS but by returning positive results from the functions calls during the installation. For example, when a file is created in a system folder the file will not really be created but a result representing the successful creation of the file will be returned from the function call to the installer. On one hand, this makes it possible to install the software correctly, but on the other, it does not guarantee its stable operation.

It is also worth mentioning the possible use of statistics in the steps of FIG. 2A, and their subsequent storage in a cloud service for an earlier prevention (before the launch of the installer or the accomplishment of changes in the system) of the launch of installers of such undesirable programs 130 or for an earlier warning to the user 150. Thanks to information obtained from other users and its accumulation in a cloud service it is possible at an early stage to ascertain the fact of the launch of such an installer (using the hash or other key information from the file being launched). Also, thanks to information obtained from other users about the sources of the downloading of these installers, it is possible at an early stage to block the downloading or warn the user 150 before he downloads such a program. Therefore, it is possible not only to prevent the launch of such programs 130, but also to save the user 150 network traffic and time.

Regarding step 253, to determine the options corresponding to switching or blocking with a user warning during installation, we can use the following approaches:

preliminary analysis of the installers of popular programs with uploading of the results to a database that can be updated through the Internet; and analysis of the graphical user interface (GUI) of the installer and an heuristic determination of the "undesirability" of various control elements on the basis of the results (e.g. analysis using key words).

Figure 3:
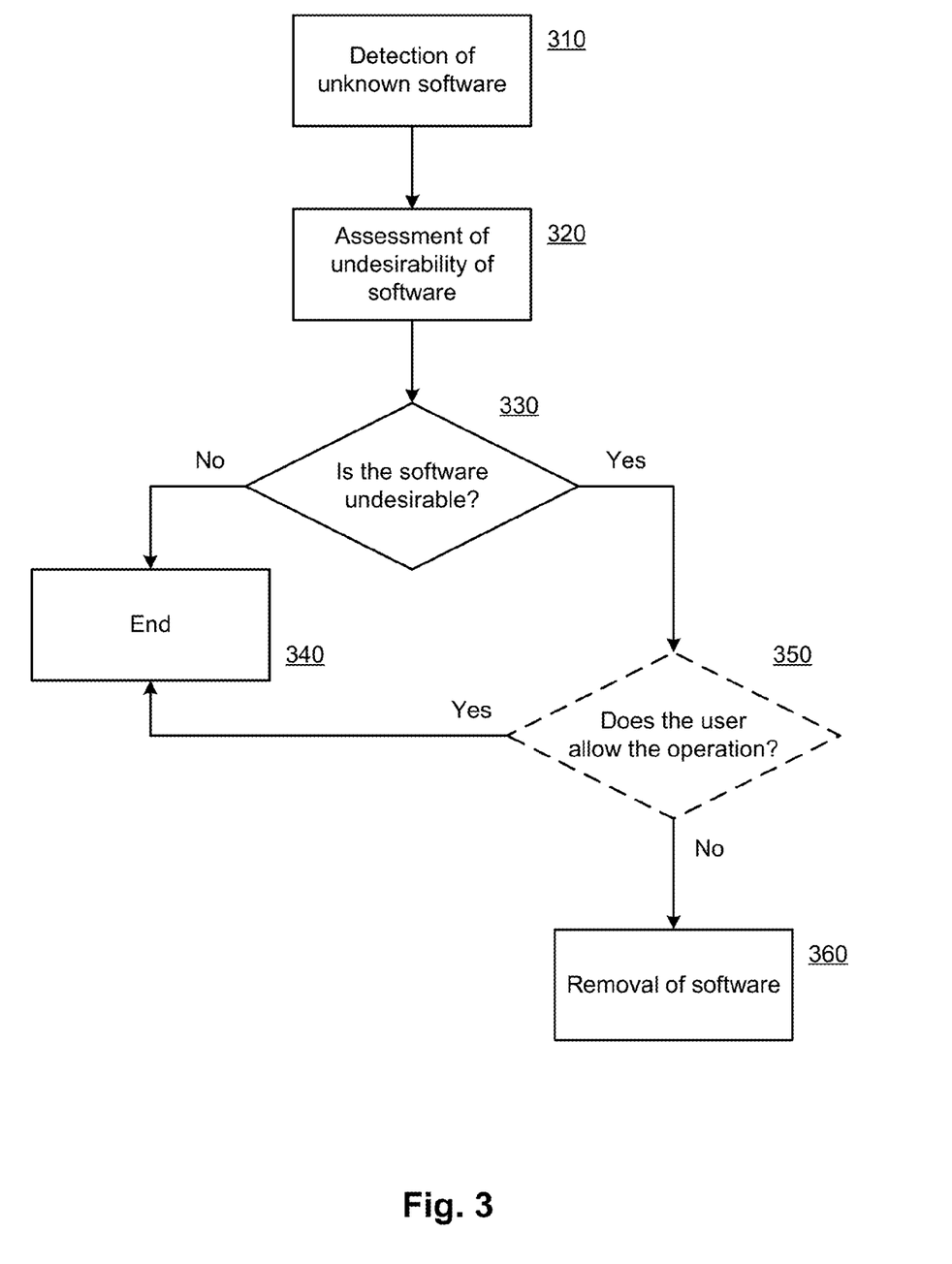
FIG. 3 illustrates an exemplary method of preventing execution of undesirable programs.

FIG. 3 illustrates an exemplary method of preventing execution of undesirable programs. At step 310, unknown installed software is detected in the system 100. As a rule, such detection can be associated with a whole-disc antivirus scan (e.g. by means of the detector 140) or during the downloading of the unknown installed software. One further example may be associated with a search of the application window, which is periodically brought to the front and shown to the user (e.g. in the case of FakeAV), with subsequent determination of the process, which controls one window. At step 320, the undesirability of the software is assessed. This assessment concerns the undesirable actions that the unknown installed software is performing. Examples of such actions are given in the description of FIG. 2A. In addition, the assessment can also occur during the operation of the software itself in real time (e.g. using the technology described in the commonly owned U.S. Pat. No. 8,566,943, which is incorporated herein by reference). Assessment of undesirability can also include the use of weights of undesirability during the assessment of the actions of the unknown installed software. Examples are also given in more detail in the description of FIG. 2A. If at step 330, unknown installed software is recognized as undesirable, then at step 350 (which is optional in one exemplary aspect) the user can be asked permission to continue the operation of the unknown installed software. If the user allows the operation, then at step 340, the unknown installed software will no longer be analyzed as undesirable software. Otherwise, at step 360, the unknown installed software is removed. The choice of the user to remove such software (or to cancel it) can be remembered, and in the future in the detection of undesirable software with analogous undesirable actions the step 350 can be omitted automatically, taking into account the choice made previously by the user.

Unknown installed software can be removed by one of the following methods:

standard removal of the application from Programs and Features (application uninstaller call-up);

automatic removal of all files and branches of the OS registry that pertain to the unknown installed software (in one exemplary aspect the detector 140 tracks such file activity and registry activity);

notifying the user that in the system there is undesirable software that it is desirable to remove.

One further extension to the steps for assessing undesirability—steps 240 in FIG. 2A and 330 in FIG. 3. Undesirability can also be taken into account by the software manufacturer, who is most often identified by a digital signature. If for certain types of software with one and the same digital signature a verdict of undesirability has been reached, then in the future this can be taken into account in the enumerated steps, e.g. in the form of an increase in the weight of undesirability of new types of software with a specific digital signature. Such feedback can be collected from users on whose computers such software first appears. Such users can themselves point out undesirable software, forbidding the installation of (or removing) certain applications and marking them as undesirable, and this will be taken into account by the detector 140, which forms in the final analysis a certain rating about the undesirability of applications, starting from their metadata (such as the digital signature, size, icon, etc.).

In one exemplary aspect, the detector 140 maintains a previously formulated list of undesirable software, which makes it possible to detect immediately such software already installed on the user's computer. The following table can be an example of such a list:

| Icon (optional) | File name | Application | Manufacturer | On change of the system settings |
|---|---|---|---|---|
|  | <file-name>.exe | App @Publisher_name | LLC Publisher_name | Always block |
|  | <file-name2>.exe | Search App by Publisher_name2 | Publisher_name2, LLC | Always allow |

Figure 4:
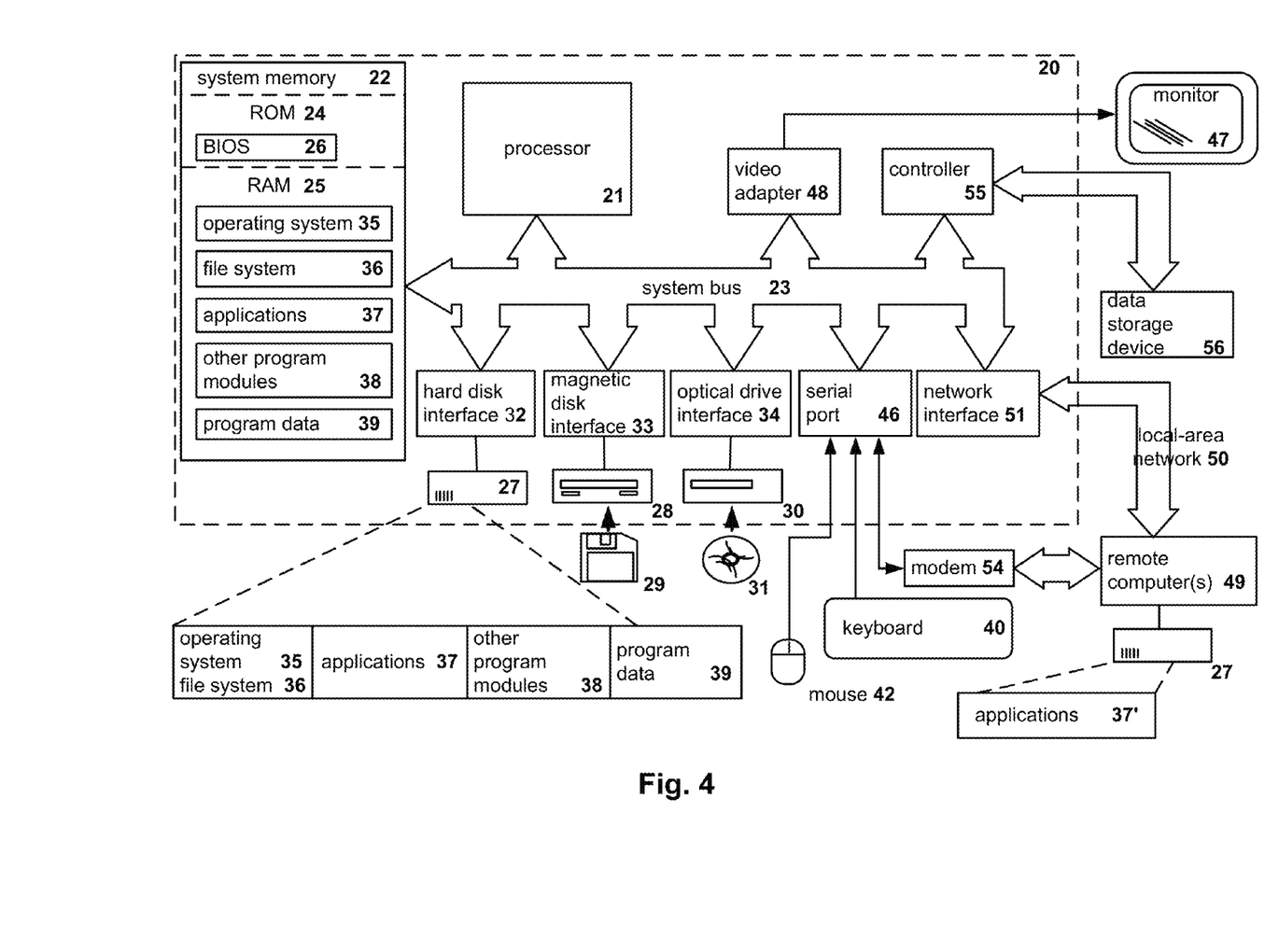
FIG. 4 illustrates an example of a general-purpose computer system on which the disclosed systems and method can be implemented.

FIG. 4 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 6. Other devices can also be present in the computer network, such as rthird-partys, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling installation of programs, the method comprising:
    detecting, by a processor, installation of an unknown program on a computer;
    suspending, by the processor, installation of the unknown program;
    executing, by the processor, the unknown program in a secure environment;
    detecting, by the processor, undesirable actions of the unknown program, wherein the undesirable actions include at least one of: actions performed by the program without knowledge of a user, actions for accessing personal user data on the computer, and actions effecting user's working with other programs or operating system of the computer;
    determining, by the processor, whether the unknown program is undesirable or not based on the detected undesirable actions of the program;
    when the unknown program is determined be undesirable, prompting the user to select whether to allow or prohibit installation of the undesirable program on the computer; and
    when the unknown program is determined not to be undesirable, allowing installation of the unknown program on the computer;
    analyzing graphical user interface (GUI) of a program installer for presence of active undesirable GUI elements; and
    deactivating one or more detected undesirable GUI elements to prevent execution of one or more undesirable actions of the program.

2. The method of claim 1, wherein determining whether the unknown program is undesirable or not further includes:
    assigning numeric weights to the detected undesirable actions, wherein undesirable actions performed without user knowledge have greater numeric weights than other undesirable actions effecting user's working with other programs or operating system.

3. The method of claim 2, wherein determining whether the unknown program is undesirable or not further includes:
    adding the numeric weights of the detected undesirable actions; and
    when the sum of the numeric weights of all detected undesirable actions exceeds a predetermined threshold, designating the unknown program to be undesirable.

4. The method of claim 1, further comprising:
    saving the user selection of whether to allow or prohibit installation of the unknown program on the computer; and
    upon later attempt to install or execute the same program on the user computer automatically performing the saved user selection without prompting the user again.

5. The method of claim 1, wherein undesirable actions further include at least one of: modification of network setting, modification of browser settings, creation of icons on the computer desktop and activation of popup windows.

6. A system for controlling installation of programs, the system comprising:
    a hardware processor configured to:
    detect installation of an unknown program on a computer;
    suspend installation of the unknown program;
    execute the unknown program in a secure environment;
    detect undesirable actions of the unknown program, wherein the undesirable actions include at least one of: actions performed by the program without knowledge of a user, actions for accessing personal user data on the computer, and actions effecting user's working with other programs or operating system of the computer;
    determine whether the unknown program is undesirable or not based on the detected undesirable actions of the program;
    when the unknown program is determined be undesirable, prompt the user to select whether to allow or prohibit installation of the undesirable program on the computer; and
    when the unknown program is determined not to be undesirable, allow installation of the unknown program on the computer;
    analyze graphical user interface (GUI) of a program installer for presence of active undesirable GUI elements; and
    deactivate one or more detected undesirable GUI elements to prevent execution of one or more undesirable actions of the program.

7. The system of claim 6, wherein determining whether the unknown program is undesirable or not further includes:
    assigning numeric weights to the detected undesirable actions, wherein undesirable actions performed without user knowledge have greater numeric weights than other undesirable actions effecting user's working with other programs or operating system.

8. The system of claim 7, wherein determining whether the unknown program is undesirable or not further includes:
    adding the numeric weights of the detected undesirable actions; and
    when the sum of the numeric weights of all detected undesirable actions exceeds a predetermined threshold, designating the unknown program to be undesirable.

9. The system of claim 6, further comprising:
    saving the user selection of whether to allow or prohibit installation of the unknown program on the computer; and
    upon later attempt to install or execute the same program on the user computer automatically performing the saved user selection without prompting the user again.

10. The system of claim 6, wherein undesirable actions further include at least one of: modification of network setting, modification of browser settings, creation of icons on the computer desktop and activation of popup windows.

11. A non-transitory computer-readable storage medium comprising computer-executable instructions for controlling installation of programs, including instructions for:
  detecting installation of an unknown program on a computer;
  suspending installation of the unknown program;
  executing the unknown program in a secure environment;
  detecting undesirable actions of the unknown program, wherein the undesirable actions include at least one of: actions performed by the program without knowledge of a user, actions for accessing personal user data on the computer, and actions effecting user's working with other programs or operating system of the computer;
  determining whether the unknown program is undesirable or not based on the detected undesirable actions of the program;
  when the unknown program is determined be undesirable, prompting the user to select whether to allow or prohibit installation of the undesirable program on the computer; and
  when the unknown program is determined not to be undesirable, allowing installation of the unknown program on the computer;
  analyzing graphical user interface (GUI) of a program installer for presence of active undesirable GUI elements; and
  deactivating one or more detected undesirable GUI elements to prevent execution of one or more undesirable actions of the program.

12. The storage medium of claim 11, wherein instructions for determining whether the unknown program is undesirable or not further include instructions for:
  assigning numeric weights to the detected undesirable actions, wherein undesirable actions performed without user knowledge have greater numeric weights than other undesirable actions effecting user's working with other programs or operating system.

13. The storage medium of claim 12, wherein instructions for determining whether the unknown program is undesirable or not further include instructions for:
  adding the numeric weights of the detected undesirable actions; and
  when the sum of the numeric weights of all detected undesirable actions exceeds a predetermined threshold, designating the unknown program to be undesirable.

14. The storage medium of claim 11, further comprising instructions for:
  saving the user selection of whether to allow or prohibit installation of the unknown program on the computer; and
  upon later attempt to install or execute the same program on the user computer automatically performing the saved user selection without prompting the user again.

15. The storage medium of claim 11, wherein undesirable actions further include at least one of: modification of network setting, modification of browser settings, creation of icons on the computer desktop and activation of popup windows.

* * * * *